No. 852,015. PATENTED APR. 30, 1907.
H. L. DUNCAN.
BALE OF FIBROUS MATERIALS.
APPLICATION FILED MAR. 21, 1903.
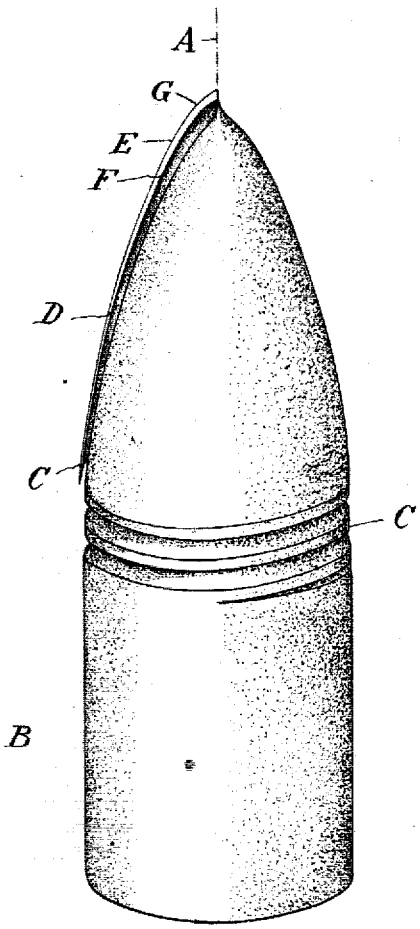

UNITED STATES PATENT OFFICE.

HARRY L. DUNCAN, OF NEW YORK, N. Y.

BALE OF FIBROUS MATERIALS.

No. 852,015.　　　　Specification of Letters Patent.　　　Patented April 30, 1907.

Application filed March 21, 1903. Serial No. 148,810.

*To all whom it may concern:*

Be it known that I, HARRY L. DUNCAN, a citizen of the United States, and a resident of New York city, in the county of Kings and State of New York, have invented certain new and useful Improvements Relating to Bales of Fibrous Material, of which the following is a specification, taken in connection with the accompanying drawing, showing in perspective an illustrative embodiment of the same.

This invention relates to bales formed of fibrous material composed of helical layers compressed together to form a substantially cylindrical bale.

In the illustrative embodiment of this invention shown in the drawing the bale is formed of layers of material having a substantially parabolic section, the nested layers being compressed together in such a way as to form a coherent or self binding bale B. The section of one of these bales is indicated in the drawing as D, the layer being shown in the compressed condition in which it exists within the completed bale, but separated somewhat from the adjacent layer in order to indicate the structure more clearly. As is seen, both the upper edge E and the lower edge F are substantially parabolic with relation to the axis A, and the axial thickness of the layer, that is, the thickness in a direction parallel to the axis of the bale, is the same at the center as at the circumference of the bale. A bale of this description may be formed by winding one or more helical ribbons or layers having such an inclined curved section and would be coherent or self-binding the same as the blanket or convolutionally wound bale by reason of the layers of compressed material nesting together. The external portions of such a bale near the circumference are nearly parallel to the axis so that radial expansion of the material of the bale is resisted by the circumferential strength of the material and furthermore, longitudinal expansion after the bale is once formed is prevented by the frictional engagement of the adjacent layers due to the radial pressure between them. By giving the layers of the bale a varying cross-section so that the axial portion G of each layer is more nearly perpendicular to the axis than that portion of the layer located farther from the axis and nearer the circumference of the bale, which may be done by forming the layers with the curved cross-section indicated, the excessive radial pressure which exists in the blanket bale is prevented. The portion of the bale near the axis is thus formed of layers arranged at a sufficient angle to the axis so that this material does not excessively compress the central or axial portion of the bale, but on the contrary, these inclined layers near the axis resist the radial pressure exerted upon them by the compressed outer portions of the bale and a more desirable distribution of the material is secured throughout the various parts of the bale.

By forming a bat of material of regulated thickness so that the amount of material in the various parts of the bat along its width are regulated the proper distribution of material throughout the various portions of the bale is secured. Any desired number of bats of this character may be fed to the protruding curved end of the forming bale and continuously compressed against it, the shape of the protruding reduced end which projects from the cylindrical body of the bale being maintained constant as the helical convolutions are continuously applied to it and compressed upon the material already in the bale. Each bat of material is preferably continuous and positively fed in a radial direction, although it may be fed to the protruding end of the forming bale at a suitable inclination and this may be accomplished by positively feeding such bat of material into the slot of a paraboloidal cap plate which incloses the protruding end of the bale and serves to compress the material against it. The bale is rotated relatively to the cap plate and its axial movement away from the cap plate is also preferably positively regulated so as to produce the desired density within the bale. By suitably regulating the thickness of the bat each layer of the bale may be formed of uniform density from center to circumference and by suitably regulating the axial movement of the bale the density of the material in the several layers may be made uniform. If desired, however, any other preferred distribution of the material in the various parts of the bale may be made. A cylindrical bale of this character may be produced by employing the apparatus disclosed in the patent to Duncan, 672,394, of April 16, 1901, and the cylindrical bale may, of course, be severed into lengths and bound with wires and otherwise covered and prepared for shipment.

The inclination of the layers of the bale can, of course, be varied and the shape of the layer section can be modified by those familiar with this art. Furthermore, other changes may be made in the form, proportions and numbers of elements of which these bales are composed without departing from the spirit of this invention. I do not, therefore, wish to be limited to the details of the disclosure which has been made in this case, but

What I claim as new and what I desire to secure by Letters Patent is set forth in the appended claims.

1. A cylindrical bale of substantially uniform density formed of nested helical layers having a substantially parabolic cross-section.

2. A cylindrical bale formed of nested layers having a substantially parabolic cross-section.

3. A cylindrical bale composed of nested layers having a substantially parabolic cross-section each layer having a substantially uniform density from center to circumference.

4. A cylindrical bale composed of nested layers having a varying cross-section, the portions of said layers adjacent the axis of the bale being more nearly perpendicular to said axis than portions more remote from said axis.

5. A cylindrical bale composed of nested layers, each having a substantially uniform density from center to circumference, said layers having a curved cross-section and the portions of said layers adjacent the axis of the bale forming a greater angle therewith than portions more remote from said axis.

HARRY L. DUNCAN.

Witnesses:
 JESSIE B. KAY,
 ALEXANDER MITCHELL.